(12) United States Patent
Kim et al.

(10) Patent No.: US 7,028,316 B2
(45) Date of Patent: Apr. 11, 2006

(54) APPARATUS FOR LOADING A DISK IN AN OPTICAL DISK PLAYER

(75) Inventors: Gyoo-beom Kim, Suwon (KR); Hwan-seung Lee, Suwon (KR); Young-yun Seol, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 215 days.

(21) Appl. No.: 10/392,896

(22) Filed: Mar. 21, 2003

(65) Prior Publication Data

US 2003/0235131 A1 Dec. 25, 2003

(30) Foreign Application Priority Data

Jun. 22, 2002 (KR) ........................................ 2002-35119

(51) Int. Cl.
*G11B 17/04* (2006.01)

(52) U.S. Cl. ..................................................... 720/621
(58) Field of Classification Search ................. 720/616, 720/621, 645; 369/77.11, 77.21, 75.11
See application file for complete search history.

(56) References Cited

U.S. PATENT DOCUMENTS 5,764,612 A * 6/1998 Tanaka et al. .............. 720/623
6,594,218 B1 * 7/2003 Kikuchi et al. ............. 720/621
2003/0227856 A1   12/2003 Kim et al.
2003/0235132 A1 * 12/2003 Lee et al. ................... 369/77.1

* cited by examiner

*Primary Examiner*—Allen Cao
(74) *Attorney, Agent, or Firm*—Roylance, Abrams, Berdo & Goodman, L.L.P.

(57) ABSTRACT

An apparatus for loading a disk in a disk player. The apparatus includes a main chassis on which a transferring roller for transferring the disk to the inside of the player is mounted; a power transferring unit for transferring power of a driving motor to the transferring roller; and a slider mounted on the main chassis, for being moved back and forth along a loading direction of the disk, and which is selectively connected to the power transferring unit, for being driven back and forth. The apparatus further includes an interworking mechanism for guiding the disk into a chucking position, and which is moved and pushed by the disk going forward upon entrance of the disk, to move the slider to connect with the power transferring unit; and a sub-chassis for cooperating with the slider to move back and forth in a direction perpendicular to the loading direction, and to cooperate with the interworking mechanism to isolate the interworking mechanism from the disk positioned on the chucking position. The apparatus further includes a locking lever that cooperates with the disk moving in the loading and unloading directions or with the sub-chassis, to selectively lock or unlock a movement of the interworking mechanism; and an impulse alleviating device for alleviating an impulse generated when the interworking mechanism is restored to an original position

12 Claims, 13 Drawing Sheets

APPARATUS FOR LOADING A DISK IN AN OPTICAL DISK PLAYER

This application claims benefit under 35 U.S.C. § 119 from Korean Patent Application No. 2002-35119, filed on Jun. 22, 2002, the entire content of which is incorporated herein by reference.

BACKGROUND OF THE INVENTION

1. Field of the Invention

The present invention relates to an apparatus for loading a disk, such as a compact disk (CD), into a disk player, such as an optical disk player. More particularly, the present invention relates to an apparatus for loading a disk into a disk player having no tray, such as a CD player adapted for use in a vehicle.

2. Description of the Related Art

A disk drive is an apparatus for recording information on a disk, such as a compact disk (CD), CD-Read Only Memory (CD-ROM), Digital Video Disk (DVD), DVD-ROM, or for playing the recorded information. Such a disk drive has a loading apparatus for mounting the disk at the position for recording or playing information to or from the disk. The disk is inserted from the front direction of the disk player by the loading apparatus, is loaded onto a turn table, and is clamped by a chucking unit so that it can rotate. While the disk rotates on the turn table, an optical pickup moves in the radial direction of the disk, thus recording information onto the disk or reading information from the disk.

A disk player for use in vehicle typically includes a disk loading apparatus capable of directly loading the disk without a tray due to restrictions in space. Also, a loading apparatus capable of selectively loading disks of different sizes is now in use so that 80 mm or 120 mm disks could be used arbitrarily.

FIG. 1 is a structural view illustrating the apparatus for loading the disk of the disk drive for use in vehicle disclosed in Korean patent application No. 10-2002-32282 of the present applicant, the entire contents of which are incorporated herein by reference. The apparatus for loading the disk is capable of selectively loading 120 mm or 80 mm disks. Operation for loading a 120 mm disk will now be described.

The 120 mm disk 1 is received into the inside of the disk player and contacts a locking pin 72 of a locking lever 70, and then the locking lever 70 is rotated and a locking pin 71 is moved out of a first locking groove 42b of a second pivoting plate 42. As this occurs, the disk 1 is moved forward further by a transferring roller 11, and then guiding rollers 41a and 42a are pushed by the disk 1, such that first and second pivoting plates 41 and 42 are rotated as shown in FIG. 2. In the meantime, a guiding pin 42c of the second pivoting plate 42 is moved along a main slit 62 of a sub-chassis 60. Also, the second pivoting plate 42 is rotated in a direction D, and a pushing lever 43 is rotated in a direction C. If the pushing lever 43 is rotated and a slider 30 is moved in a direction A2, then a rack gear 31 of the slider 30 is connected to a driving gear 25 so that the slider 30 is moved further in the direction A2 as shown in FIG. 3. As described in the foregoing, the slider 30 is moved in the direction A2 and a cam protuberance 33 of the slider 30 guides a cam slit 61 of the sub-chassis 60 as shown in FIG. 4, such that the sub-chassis 60 is moved in a direction B1. A locking protuberance 73 of the locking lever 70 comes into contact with the lower frame portion 63 of the sub-chassis 60 moving in the direction B1, such that the locking lever 70 is rotated and the locking pin 71 is moved out of a second locking groove 42d of the second pivoting plate 42. At this moment, the guiding pin 42c of the second pivoting plate 42 is guided along a slit 62a of the sub-chassis 60, such that the second pivoting plate 42 is rotated further in the direction D, and the first pivoting plate 41 cooperates with the second pivoting plate 42, rotating further in the direction D. Therefore, the first and the second guiding rollers 41a and 42a are separated from the disk 1, and the disk 1 is safely put on a turn table (not shown) by a chucking unit 6. Furthermore, the transferring roller 11 is controlled by the slider 30 moved in the direction A2, and is isolated from the disk 1.

When the apparatus has loaded the disk as discussed above, recording of information on the disk 1 or reading of recorded information from the disk 1 can be performed.

In order to remove the disk 1, the driving gear 25 shown in FIG. 3 is rotated in opposite direction. Therefore, the slider 30 is returned along the direction A1. When this occurs, the transferring roller 11 comes into contact with the disk 1 and is rotated first, to transfer the disk 1 along direction A2, and to subsequently transfer the sub-chassis 60 along a direction B2.

When this occurs, as shown in FIG. 5, the locking lever 70 is rotated by the disk 1 being withdrawn, such that the locking pin 71 is moved out of the second locking groove 42d. As described above, the guiding pin 42c does not withdrawn from slit 62a even though the second pivoting plate 42 is separated from the locking lever 70, so that the second pivoting plate 42 can not be returned to the initial position. Therefore, the space between the first and second guiding rollers 41a and 42a and the disk 1 becomes widened. Then, the moment that the sub-chassis 60 is returned further along the direction B2 andt the guiding pin 42c is moved out of the slit 42a as shown in FIG. 6, the second pivoting plate 42 and the first pivoting plate 41 are returned to their initial positions quickly by the restoring force of first and second springs 43 and 45, respectively.

During the process described above, the space between the disk 1 and the guiding rollers 41a and 42a has already been widened. Therefore, a collision between the guiding rollers 41a and 42a and the disk 1 can occur due to the restoring force of the pivoting plates 41 and 42. Accordingly, an unpleasant noise is generated, and damage to the disk 1 can also occur.

SUMMARY OF THE INVENTION

An object of the present invention is to solve at least the above problems and disadvantages, and to provide at least the advantages described below.

Accordingly, one object of the present invention is to solve the foregoing problems by providing an apparatus for loading a disk in a disk player having improved structure such that a collision between guiding rollers and the disk is prevented and noise is reduced during unloading of the disk.

The foregoing and other objects and advantages are substantially realized by providing an apparatus for loading a disk into a disk player. The apparatus includes a main chassis on which is mounted a transferring roller for transferring the disk to an inside of the player; a power transferring unit for transferring power of a driving motor to the transferring roller; and a slider, mounted on the main chassis, and adapted to be moved back and forth along a loading direction of the disk, and to selectively connect to the power transferring unit to be driven back and forth. The apparatus further includes an interworking mechanism for guiding the disk into a chucking position, and which is moved and pushed by the disk going forward upon entrance of the disk into the apparatus, and which is connected to the power transferring unit by the movement of the slider. The apparatus also includes a sub-chassis for moving back and forth in a direction perpendicular or substantially perpendicular to the loading direction in cooperation with the slider, and which cooperates with the interworking mechanism to isolate the interworking mechanism from the disk positioned at a chucking position; a locking lever for selectively locking or unlocking a movement of the interworking mechanism by cooperating with the disk that is moving along the loading or unloading direction or with the sub-chassis; and an impulse alleviating device for alleviating an impulse that is generated when the interworking mechanism is restored to an original position upon unloading of the disk.

In this example, the impulse alleviating device includes a cam guiding pin projected upward from the interworking mechanism, for moving along a guiding slit provided on the main chassis upon moving of the interworking mechanism; and a cam guiding unit formed on the sub-chassis so that the cam guiding unit is perpendicular or substantially perpendicular lengthwise to the guiding slit, to come into contact with the cam guiding pin restored to an original position to control the restoring speed upon unloading of the disk.

The interworking mechanism includes a first pivoting plate which is mounted on the main chassis so that the first pivoting plate can rotate a predetermined angle, and which is adapted to be rotated when pushed by the disk going forward; and a second pivoting plate for cooperating with the first pivoting plate and mounted on the main chassis to be pushed and rotated by the disk when the disk moves forward, and for selectively being locked and unlocked to and from the locking lever. The interworking mechanism also includes a pushing lever mounted on the main chassis to be rotated, and which is adapted to cooperate with the second pivoting plate that is pushed and rotated by the disk, and to push the slider so that the slider is connected with the power transferring unit; and first and a second springs for elasticity biasing each of the first and the second pivoting plates in a direction to touch the disk.

The impulse alleviating device includes a cam guiding pin projected upward from the first pivoting plate, and adapted to move along a guiding slit formed on the main chassis; and a cam guiding unit extended lengthwise from one side of the sub-chassis so that the cam guiding unit is overlapped as much as a predetermined distance on the guiding slit, and adapted to contact the cam guiding pin restored to an original position to reduce a restoring force upon unloading of the disk.

Furthermore, upon unloading of the disk, since the sub-chassis preferably cooperates with the slider and is restored to an original position, a restoration of the cam guiding pin is allowed by reducing overlapped portion of the guiding slit and the cam guiding unit.

Additional advantages, objects, and features of the invention will be set forth in part in the description which follows and in part will become apparent to those having ordinary skill in the art upon examination of the following, or may be learned from practicing the invention. The objects and advantages of the invention further may be realized and attained as particularly pointed out in the appended claims.

BRIEF DESCRIPTION OF THE DRAWINGS

The embodiments of invention will be described in detail with reference to the following drawings in which like reference numerals refer to like elements wherein.

DETAILED DESCRIPTION OF THE PREFERRED EMBODIMENTS

Figure 1:
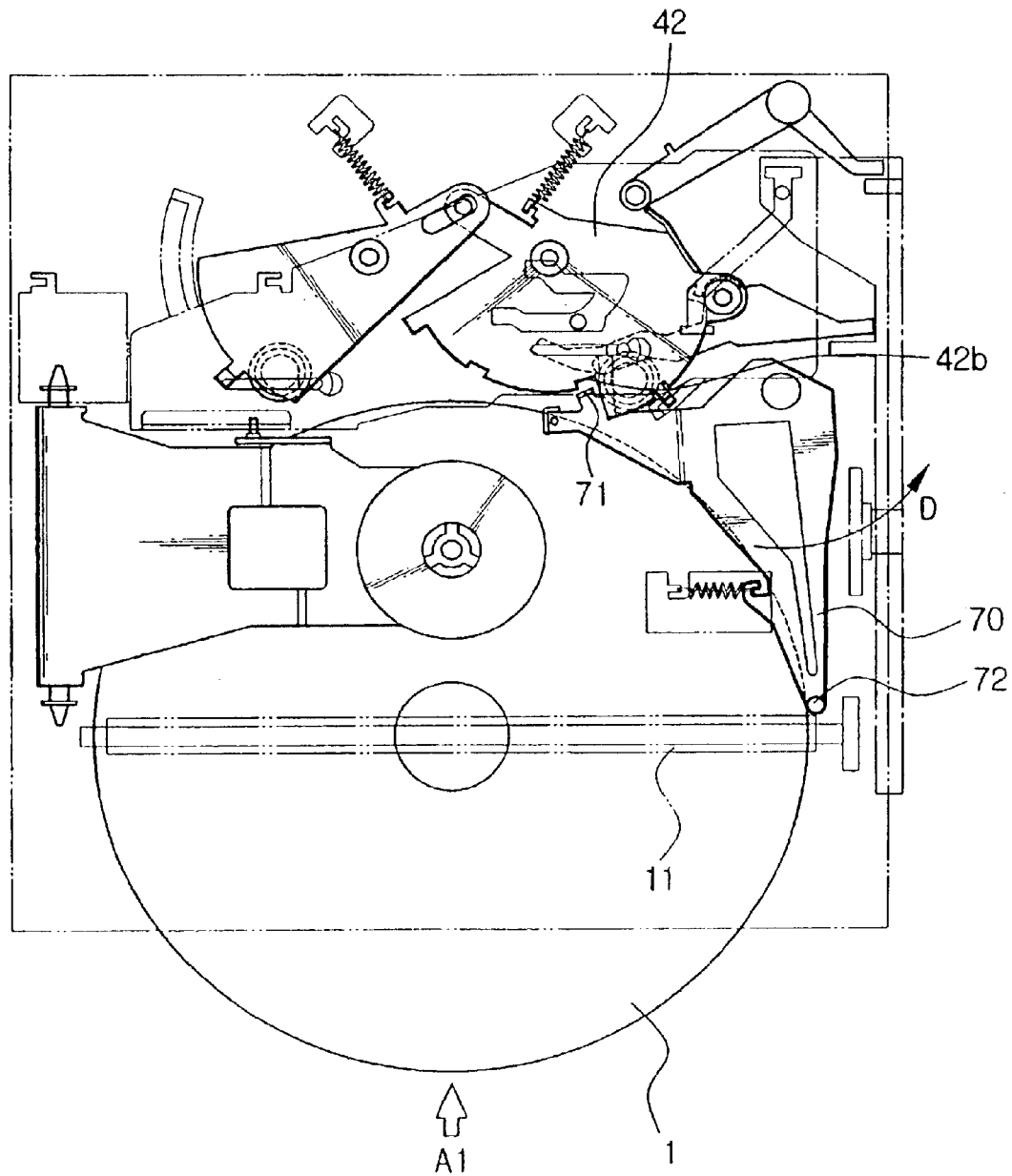
FIG. 1 through FIG. 6 are views schematically illustrating an apparatus for loading a disk in a disk player disclosed in the Korean patent application No. 10-2002-32282.
Figure 2:
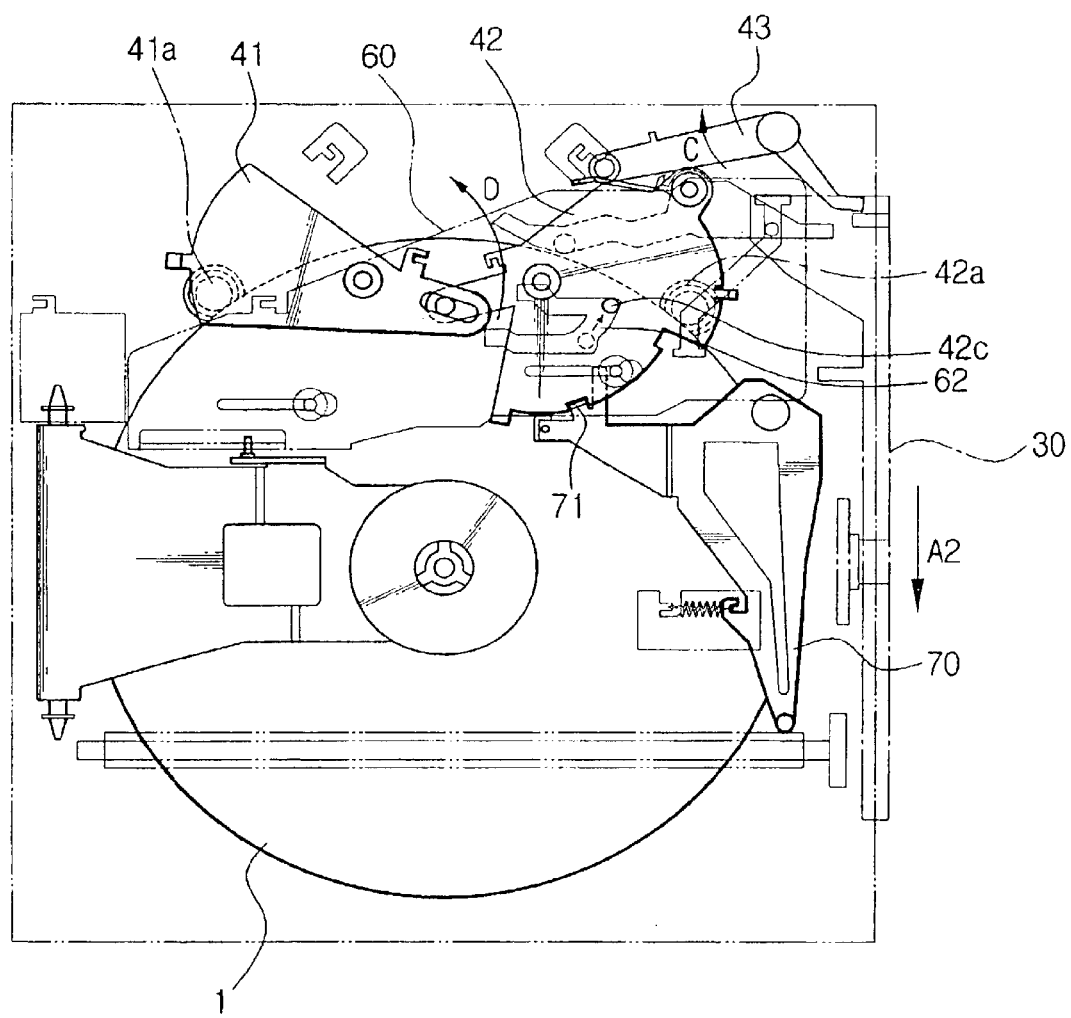

The following describes an example of an apparatus for loading a disk in a disk player according to certain embodiments of the invention with reference to the accompanying drawings.

Referring to FIG. 7 through FIG. 13, an apparatus for loading a disk in a disk player according to an embodiment of the present invention includes a main chassis 100 on which a transferring roller 110 is mounted so that the transferring roller can rotate, a power transferring unit 200 for delivering a power of a driving motor 210 to the transferring roller 100, and a slider 300 for being selectively connected to the power transferring unit 200 and being moved back and forth. The apparatus further includes an interworking mechanism 400 for operating upon loading of a disk 1, a sub-chassis 600 for cooperating with the slider 300 and being moved back and forth, a locking lever 700 for selectively locking and unlocking a movement of the interworking mechanism, and an impulse alleviating device.

In this example, the disk 1 is an ordinary 120 mm disk. However, the disk can be an 80 mm disk or can have any suitable diameter. The apparatus for loading the disk according to the embodiments of the present invention described herein is applicable to a disk player capable of selectively loading disks of different sizes without a tray, such as a disk player adapted for use in vehicle. Also, in this example, the components only related to loading and unloading operations of the 120 mm disk will be described.

The transferring roller 110 receives the power from the power transferring unit 200 and rotates to transfer the disk being received into the front side of the main chassis 100 of the disk player, to the inside of the player. Also, the transferring roller 110 operates to eject the disk from the inside of the player when appropriate. Both ends of the transferring roller 110 are supported by a hinge unit (not shown). The hinge unit is installed on the main chassis 100 so that the hinge unit can rotate and cooperate with the slider 300 so that the transferring roller 110 comes into contact with the disk being received into the player and is separated from the disk being ejected from the player.

The main chassis 100 is mounted on the upper portion of a housing 50 on which an optical pickup (not shown) is installed. On this main chassis 100, a chucking unit 60 it installed for chucking the disk 1 that is transferred to the chucking position on a turn table (not shown).

The power transferring unit 200 includes a driving motor 210 installed on the housing 50, a plurality of connecting gears 220, 230, 240 for transferring the power of the driving motor to a driven gear 111 connected to the transferring roller 110, a driving gear 250 for selectively engaging with a rack gear 310 prepared on the slider 300, and a main gear 260 coaxially connected with the driving gear 250. A simple gear 270 is connected between the main gear 260 and a connecting gear 230. The driving motor 210 selectively rotates the transferring roller 110 in forward or backward directions. Also, the slider 300 moves back and forth along the loading direction in which the disk moves.

The slider 300 is connected to the main chassis 100, and is moveable back and forth along the loading and unloading directions of the disk 1, that is, directions A1 and A2 as shown. The slider 300 has the rack gear 310 of a predetermined length. This rack gear 310 is formed so that the rack gear is spaced from the driving gear 250 until the disk 1 is loaded to the initial position, that is, the chucking position. Also, the slider 300 is biased in the direction A1 by a spring 320. Upon loading of the disk 1, the slider is pushed by the interworking mechanism 400, and becomes connected to the driving gear 250 accordingly. Also, the slider 300 has a cam protuberance 330 (see FIGS. 10–12) for moving the sub-chassis 600 along the directions B1 and B2 which are perpendicular or substantially perpendicular to the directions A1 and A2 upon movement of the slider along the directions A1 and A2.

The interworking mechanism 400 is pushed by the disk as the disk enter the main chassis 100, and thus guides the disk 1 to the chucking position upon entry, of the disk 1 into the inside of the housing 50. Also, the interworking mechanism 400 guides the disk 1 to the chucking position, and moves the slider 300 and connects the slider to the power transferring unit 200. The interworking mechanism 400 includes a first pivoting plate 410 mounted on the main chassis 100 so that the first pivoting plate 410 can rotate at a predetermined angle, a second rotating plate 420 mounted on the main chassis 100 so that the second pivoting plate can rotate at a predetermined angle and cooperate with the first pivoting plate 410, a pushing lever 430 for cooperating with the second pivoting plate 420 to push the slider 300 as much as a predetermined distance in the direction A1, and first and second springs 440 and 450 for biasing first and second pivoting plates 410 and 420 toward the direction in which the disk 1 comes into contact with them.

The first pivoting plate 410 has a first guiding roller 411 for coming into contact with the disk 1 being received in the main chassis 100, to guide the disk 1 to the chucking position. Also, the first pivoting plate 410 is guided along a guiding slit 120 formed in an arc shape in the main chassis 100. Accordingly, the disk 1 moving forward in the direction A1 pushes the first guiding roller 411, such that the first pivoting plate 410 is rotated in the direction C. Also, a long hole 412 is formed on one end of the first pivoting plate 410.

Like the first guiding roller 411, the second pivoting plate 420 has a second guiding roller 421 for coming into contact with the disk 1 that is being received in the main chassis 100, to guide the disk 1 to the chucking position. Also, the second pivoting plate 420 has a pin 423 for being fit into the long hole 412 so that the pin cooperates with the first pivoting plate 410. The second pivoting plate 420 has a first locking groove 424 formed on the frame of the second pivoting plate 420, for being connected in a locking manner with a locking protuberance 710 of the locking lever 700 at the initial position (the position shown in FIG. 7) where the disk 1 does not move forward. A second locking groove 425 is formed on the second pivoting plate 420, and is spaced a predetermined distance from the first locking groove 424. When the second pivoting plate 420 is rotated further in the direction D due to being pushed by the disk 1 going forward, the locking protuberance 710 is refit into the second locking groove 425. When the second pivoting plate 420 is positioned in an "intermediate position", the disk 1 is put in the chucking position and the first and the second guiding rollers 411 and 421 come into contact with the disk 1, respectively.

Figure 3:
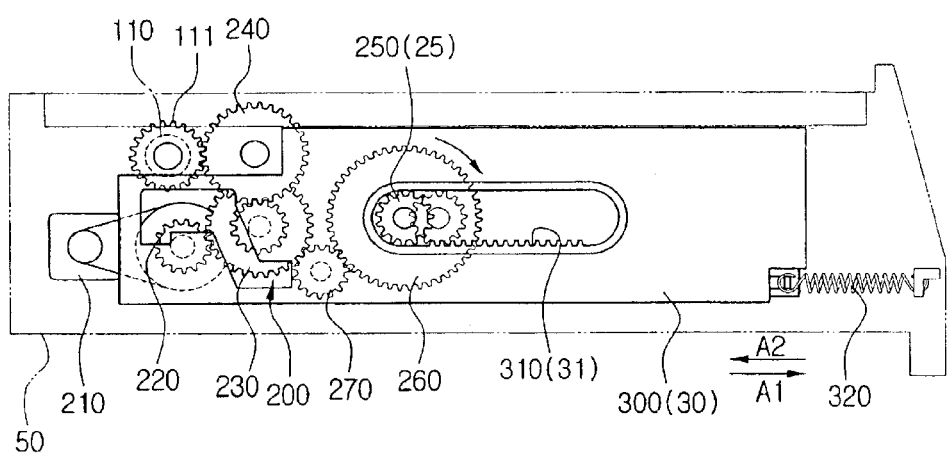
Figure 4:
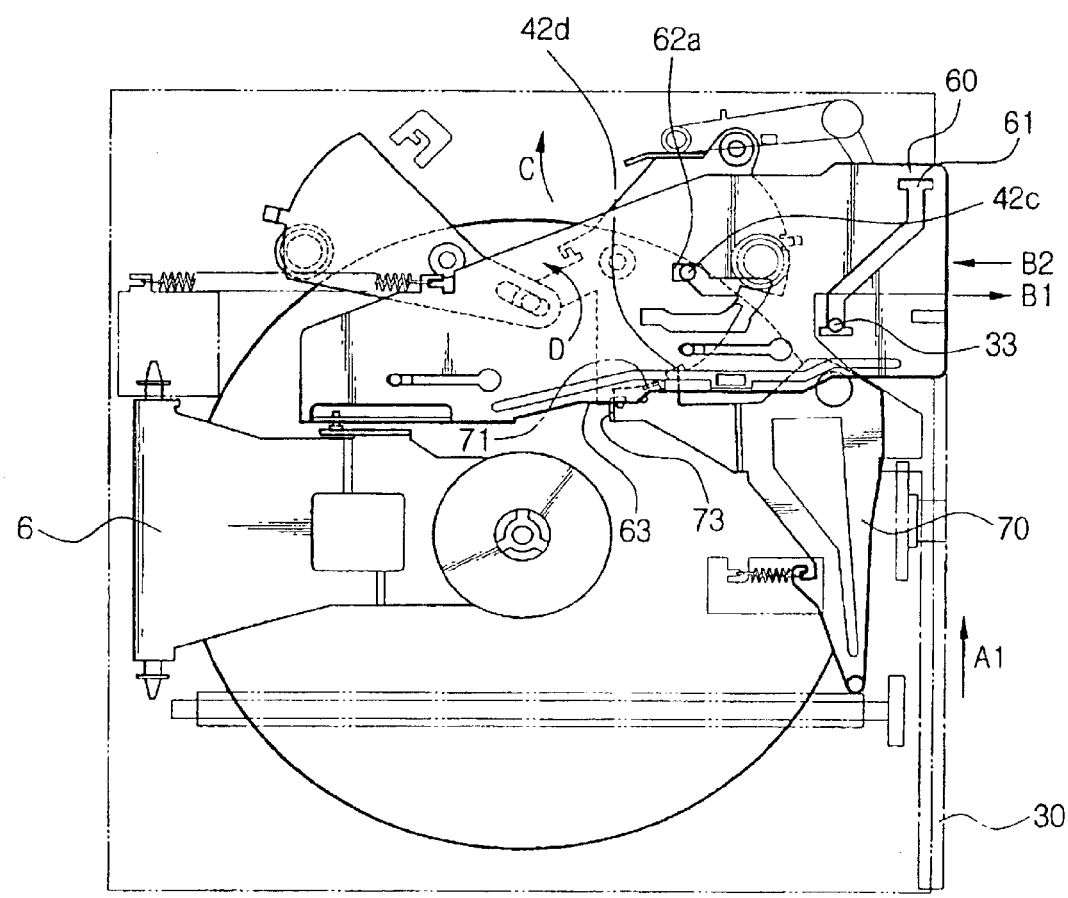
Figure 5:
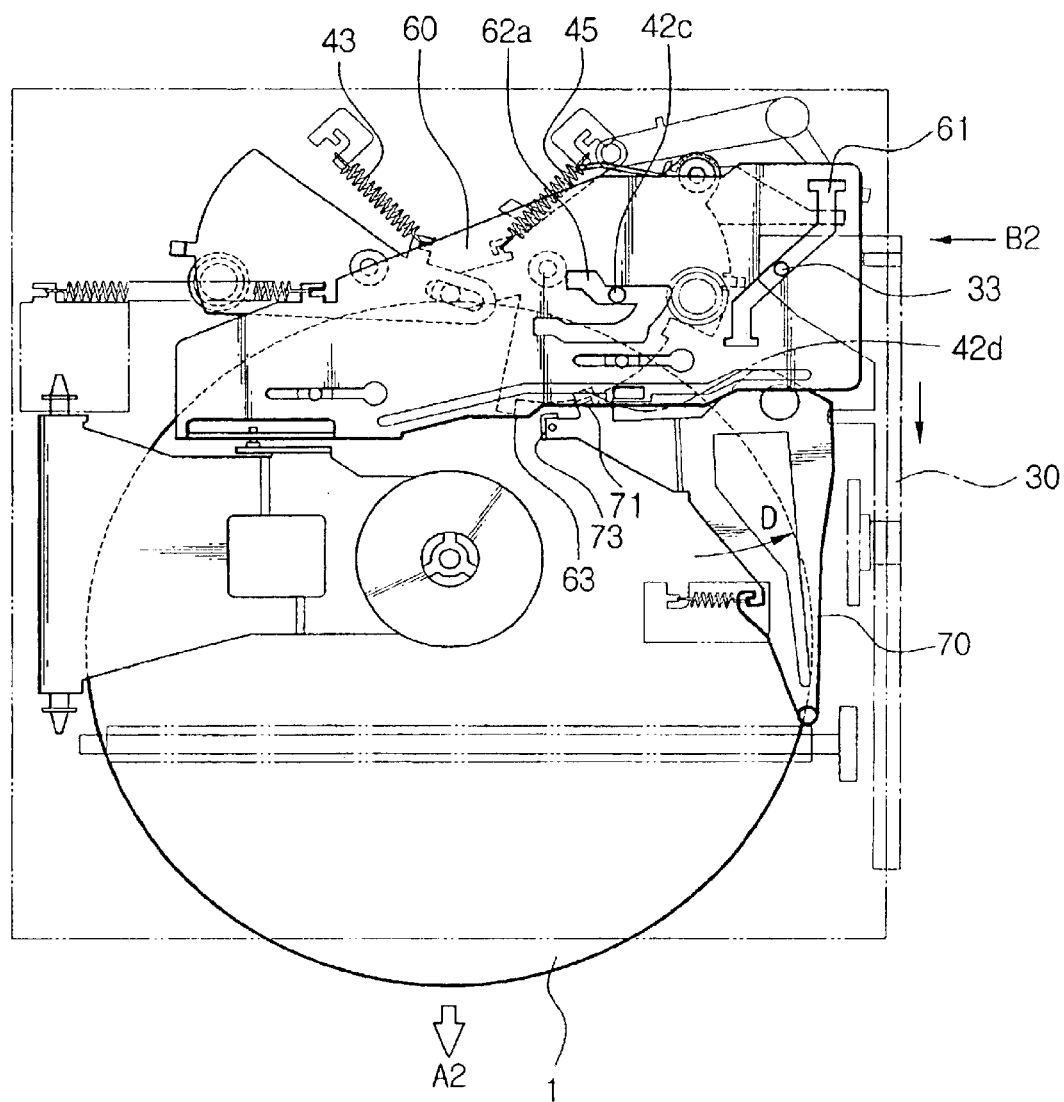
Figure 6:
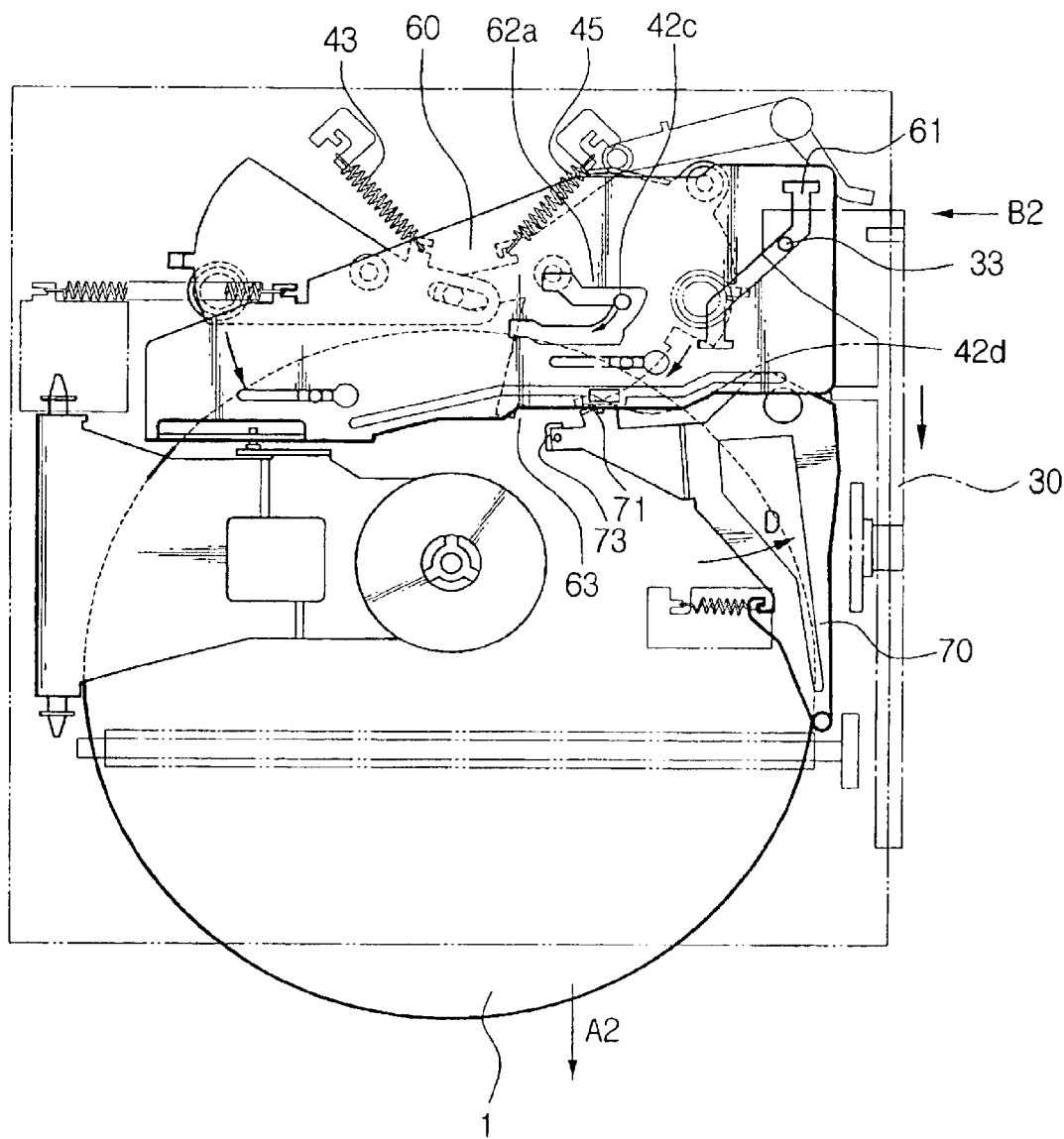

Also, a guiding pin 426 is projected from the upper side of the second pivoting plate 420. This guiding pin 426 is guided by the movement of the sub-chassis 600, and further rotates the second pivoting plate 420 in the direction D from the "intermediate position". Therefore, the first pivoting plate 410 cooperates with the second pivoting plate 420, and is rotated further in the-direction C, and the first and the second guiding rollers 411 and 421 are separated from the disk 1. Also, the second pivoting plate 420 has a touching portion 427 whose frame is bent downward partially. The touching portion 427 pushes one end of the pushing lever 430, thus further rotating the pushing lever 430 in the direction C when the second pivoting plate 420 is rotated further in the direction D from the initial position shown in FIG. 7, and is finally rotated to the "intermediate position'", that is, to the position shown in FIG. 9. Therefore, the pushing lever 430 is rotated in the direction C, and the other end of the pushing lever 430 pushes the slider 300 in the direction A1, so that the rack gear 310 and the driving gear 250 are connected with each other as shown in FIG. 3.

Figure 7:
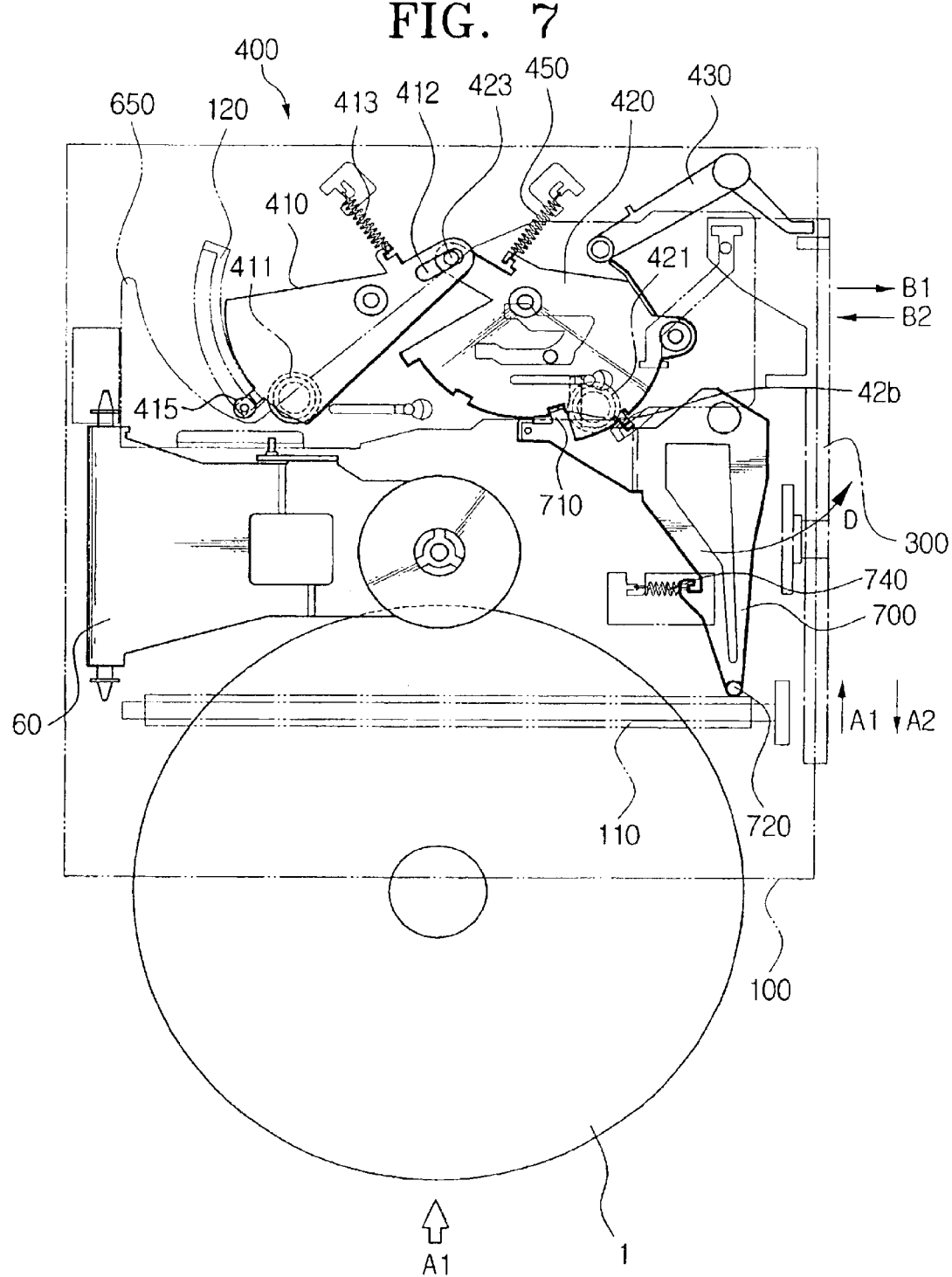
FIG. 7 is a plan view schematically illustrating an example of an apparatus for loading a disk in a disk player according to an embodiment of the present invention.

In addition, the first and the second spring 440 and 450 are connected to the main chassis 100, respectively, to bias each of the first and the second pivoting plates 410 and 420 so that both pivoting plates are positioned to the initial position as shown in FIG. 7.

The sub-chassis 600 is mounted on the upper portion of the main chassis 100 so that the sub-chassis possibly moves back and forth along the directions B1 and B2. The sub-chassis 600 moves back and forth, cooperating with the slider 300 to move the interworking mechanism 400, and thereby separating the interworking mechanism 400 from the disk 1 positioned in the chucking position. This sub-chassis 600 has a cam slit 610 for the sliding of the cam protuberance 330 of the slider 300. While the slider 300 is moved in the directions A1 and the A2, the cam slit 610 is guided by the cam protuberance 330 and the sub-chassis 600 is moved. Also, the sub-chassis 600 has a cam slit 620 for use in separation, to which the guiding pin 426 of the second pivoting plate 420 is connected.

The cam slit 620 for use in separation is for guiding the movement of the guiding pin 426 in order to separate the interworking mechanism 400, in particular, the first and the second guiding rollers 411 and 421, from the disk 1 positioned in the chucking position. The cam slit 620 includes a main slit 621 having an arc shape, for guiding the movement of the guiding pin 426 when the disk 1 moves forward to the chucking position, a first slit 623 extended from the upper end of the main slit 621, and a second slit 625 extended from the lower end of the main slit 621. The first slit 623 and the second slit 625 are symmetrical or substantially symmetrical with each other in their form. The first slit 623 is for separating the first and the second guiding rollers 411 and 421 from the disk 1 positioned in the chucking position. Therefore, upon entrance of the disk 1 into the main chassis 100, the guiding pin 426 is moved upward along the main slit 621 from the initial position shown in FIG. 7, and afterward, the guiding pin 426 is moved upward further by the stepped portion of the first slit 623 when the sub-chassis 600 is moved in the direction B1, so that the first and the second guiding rollers 411 and 421 are separated from the disk 1. The second slit 625 is for separating the interworking mechanism from, for example, an 80 mm disk when such a smaller disk is loaded into the main chassis 100.

The locking lever 700 cooperates with the disk 1 going forward into the inside of the housing 50 or the sub-chassis 600 moving in the direction B1, and is rotated so that the movement of the interworking mechanism 400 is selectively locked or unlocked. The locking lever 700 is mounted on the main chassis 100 so that the locking lever can rotate. An interfering pin 720 that comes into contact with the disk 1 is provided on one end of the locking lever 700. A locking protuberance 710 for connecting, in a locking manner, with each of the first and the second locking grooves 424 and 425 of the second pivoting plate 420, is provided on the other end of the locking lever 700. The locking lever 700 is biased in the direction the locking lever is locked to the second pivoting plate 420 by the spring 740 connected to the main chassis 100. Also, the locking lever 700 has a guiding protuberance 730 projected upward and formed adjacent to the locking protuberance 710. The guiding protuberance 730 comes into contact with the upper frame portion 730 of the sub-chassis 600 and is pushed accordingly when the sub-chassis 600 moves along the direction B1, such that the locking lever 700 rotates in the direction D so that the locking protuberance 710 can separate from the first and the second locking grooves 424 and 425.

The impulse alleviating device operates to alleviate the impulse generated when the interworking mechanism 400 is returned abruptly to the original position upon unloading of the disk 1. The impulse alleviating device includes a cam guiding member 415 projected upward from the first pivoting plate 410, and a cam guiding unit 650 provided on one side of the sub-chassis 600.

The cam guiding member 415 projects into the guiding slit 120 and moves along the guiding slit 120. Preferably, the cam guiding member 415 is a roller rotatably installed in the frame on one side of the first pivoting plate 410. Therefore, the cam guiding member 415 is guided with minimal friction upon contact with the cam guiding unit 650.

The cam guiding unit 650 is integrally formed with the sub-chassis 600. More specifically, the cam guiding unit 650 is formed such that the cam guiding unit 650 is overlapped as much as a predetermined amount in a lengthwise direction with respect to the guiding slit 120, when the sub-chassis 600 is moved a predetermined distance in the direction B1 (see FIG. 10) from the state shown in FIG. 7. Therefore, abrupt movement of the cam guiding member 415 by contact with the cam guiding unit 650 is prevented during the unloading of the disk 1, that is, when the cam guiding member 415 is returned to the original position.

An example of the operation of the apparatus for loading the disk in the disk player according to the embodiment of the present invention described above will now be described in detail.

As shown in FIG. 7, the disk 1 is moved forward in the loading direction, that is, in the direction A1, to the inside of the housing 50. Then, the entrance of the disk 1 is detected by a disk detecting sensor (not shown), and a driving motor 210 (see FIG. 3) is driven. After that, the disk 1 is moved to the inside of the housing 50 by the rotation of the transferring roller 110.

Figure 8:
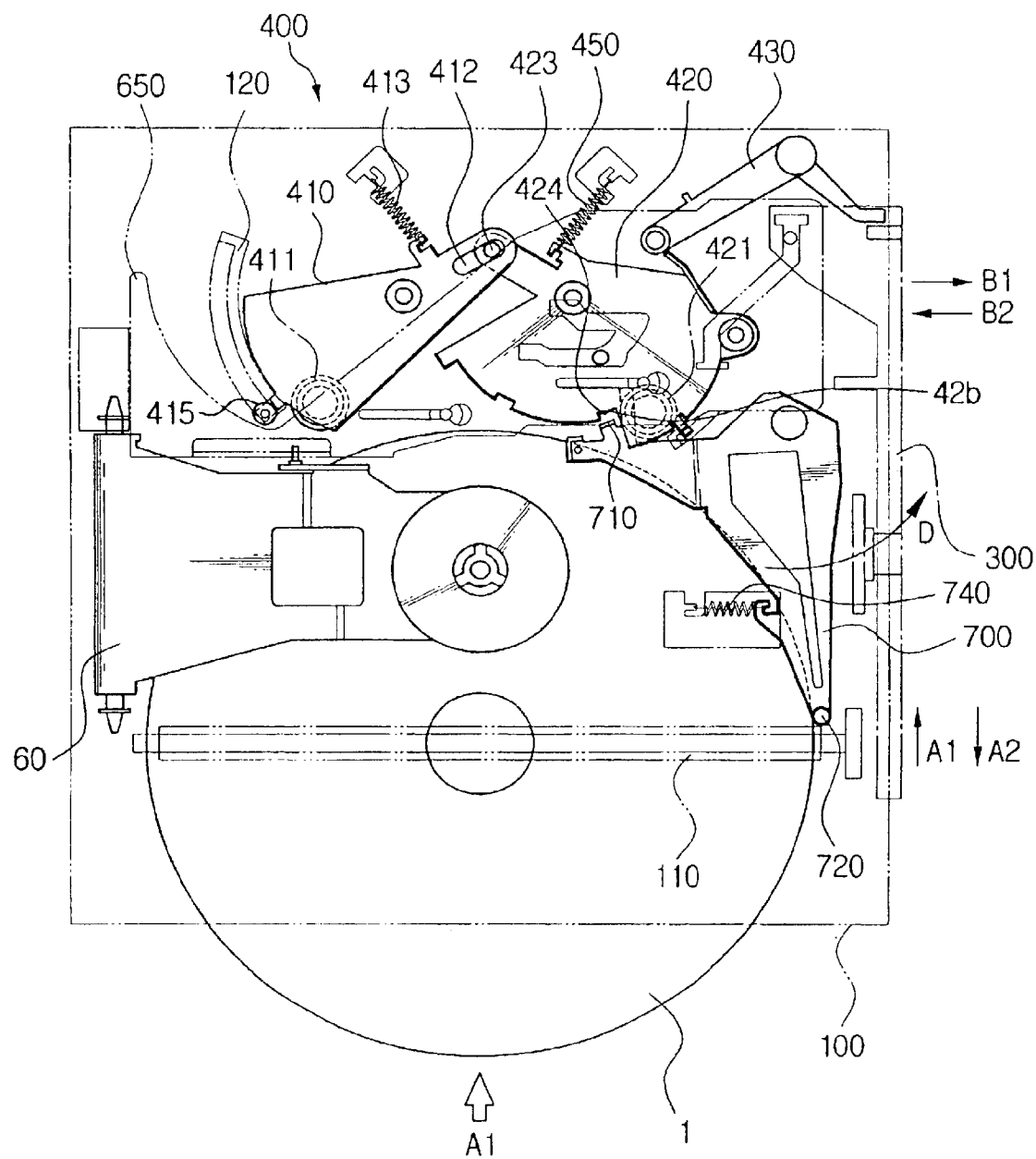
FIG. 8 through FIG. 13 are plan views schematically illustrating an example of operations performed by the apparatus for loading a disk in a disk player shown in FIG. 7 according to an embodiment of the present invention.
Figure 9:
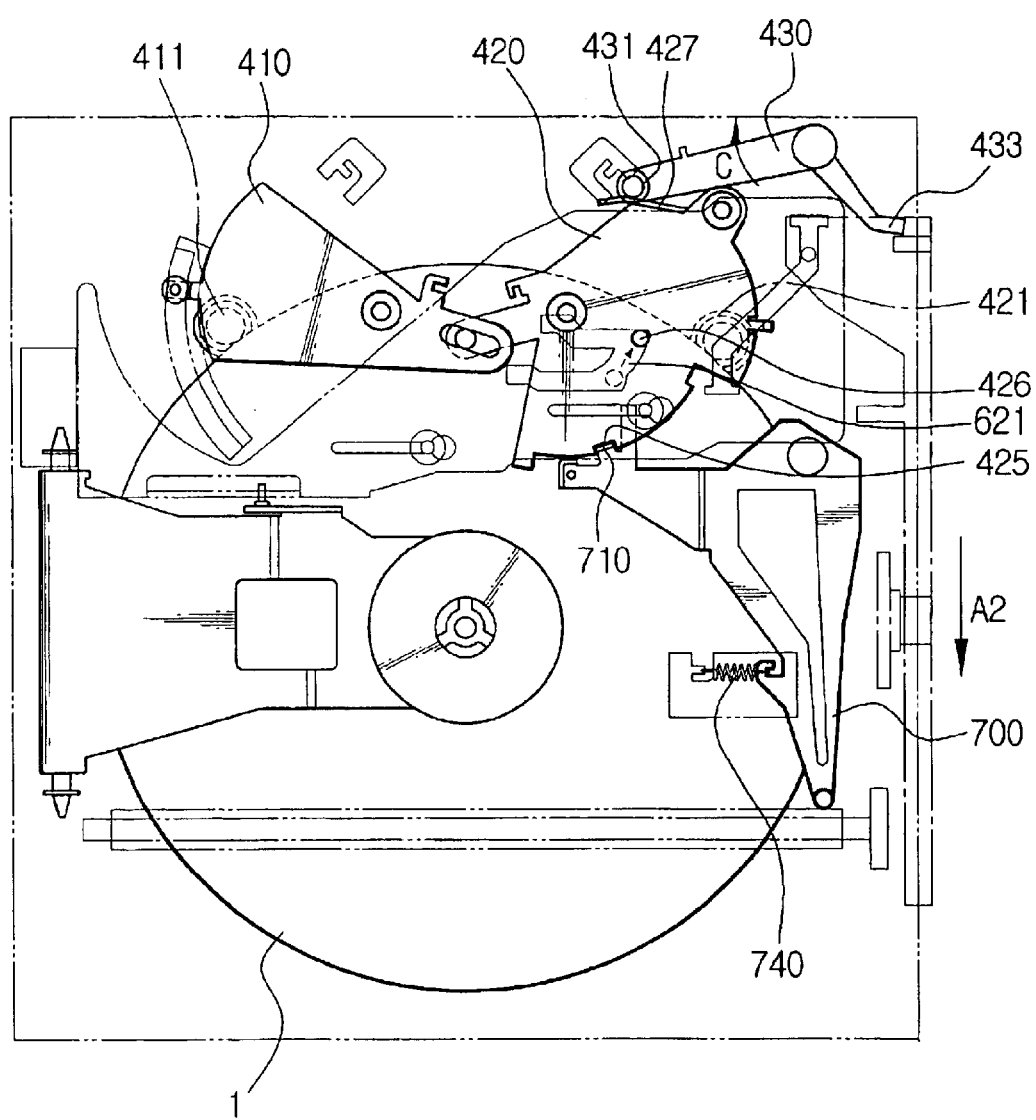

Referring to FIG. 8, as the disk 1 is received, the disk 1 comes into contact with the locking pin 720 of the locking lever 700, and rotates the locking lever 700 in the direction D. Then, the locking protuberance 710 of the locking lever 700 moves out of the first locking groove 424 of the second pivoting plate 420. If the disk 1 is moved forward further, the disk 1 pushes the first and the second guiding rollers 411 and 421, and moves to the chucking position as shown in FIG. 9. Therefore, the first and the second pivoting plates 410 and 420 are rotated in opposite directions to each other, and the guiding pin 426 is moved upward along the main slit 621 formed on the sub-chassis 600. Also, touching portion 427 of the second pivoting plate 420 pushes one end 431 of the pushing lever 430. Then, the pushing lever 430 is rotated in the direction C, and the other end 433 of the pushing lever 430 pushes the slider 300 in the direction A2 as much as a predetermined distance.

Also, the locking lever 700 is returned to the original position, and the locking protuberance 710 is connected with the second locking groove 425 of the second pivoting plate 420 in a locking manner. Therefore, the first and second guiding rollers 411 and 421 are secured in contact with the disk 1.

Figure 10:
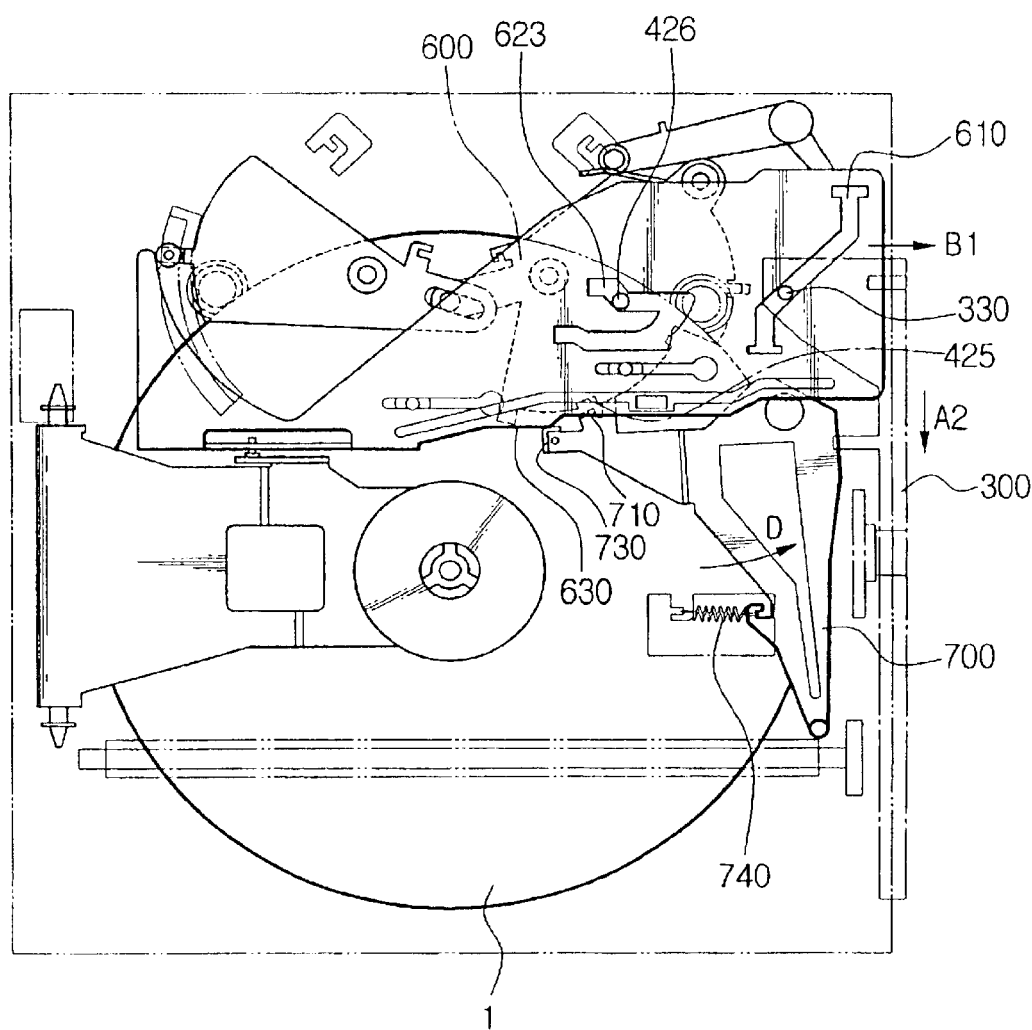
Figure 11:
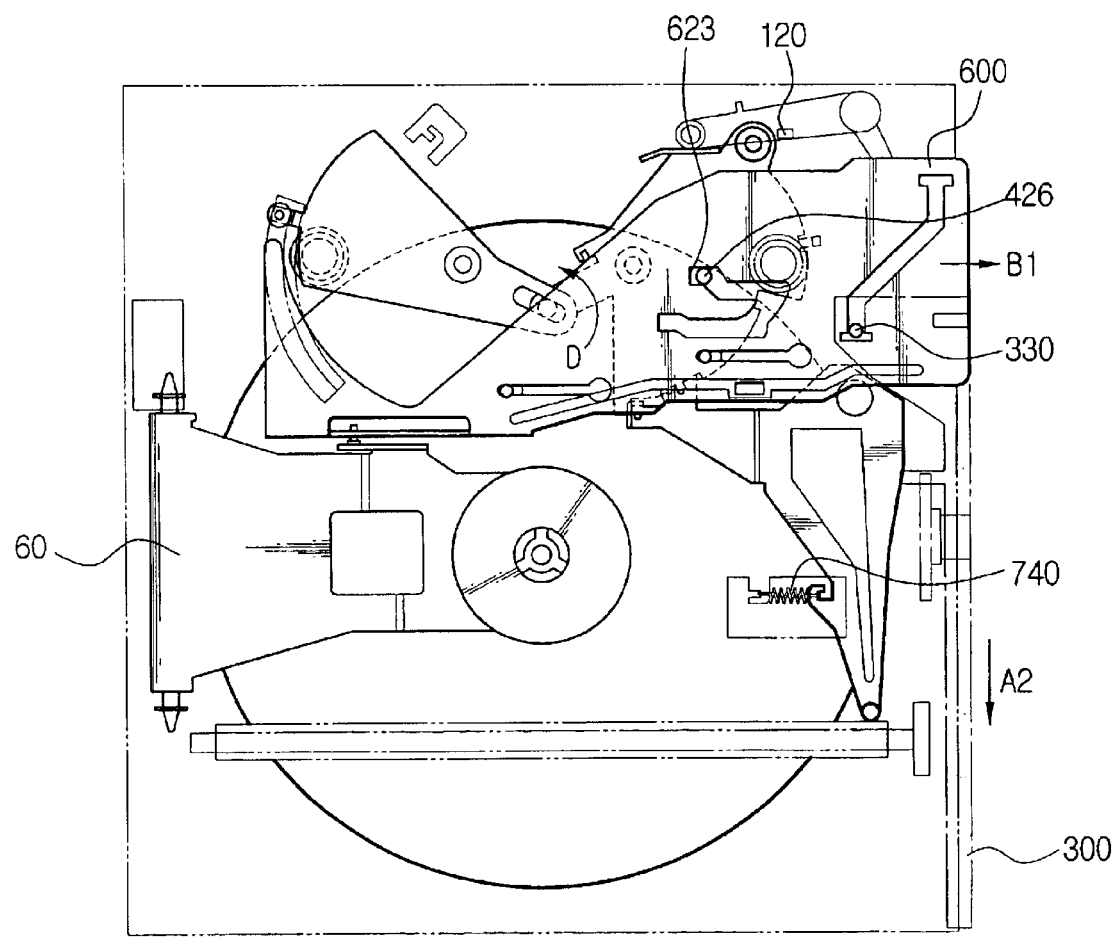

Subsequently, the slider 300 is pushed a predetermined distance in the direction A2, and the rack gear 310 is connected to the driving gear 250 as shown in FIG. 3. Then, the power of the driving gear 250 is transferred to the rack gear 310 so that the slider 300 is moved further in the direction. After that, as shown in FIG. 10, the cam slit 610 of the sub-chassis 600 is guided by the movement of the cam protuberance 330, and the sub-chassis 600 is moved in the direction B1. When the sub-chassis 600 is moved in the direction B1, the guiding pin 426 moves toward a sub-slit 623 connected to the main slit 621. Also, the frame portion 630 of the sub-chassis 600 pushes the guiding protuberance 730 of the locking lever 700, thus rotating the locking lever 700 in the direction D. Therefore, the locking protuberance 710 moves out of the second locking groove 425 and the lockage is released accordingly. If the slider 300 is moved further in the direction A2, the sub-chassis 600 is guided by the cam protuberance 330 and moved completely in the direction B1 as shown in FIG. 11. Also, the guiding pin 426 is guided by the sub-slit 623, thus further rotating the second pivoting plate 420 in the direction D, such that the first and second guiding rollers 411 and 421 are separated from the disk 1.

As described in the foregoing, if each of the guiding rollers 411 and 421 is separated from the disk 1, the disk 1 is safely put on the turn table (not shown) while being chucked in the chucking unit 60, so that the disk 1 can rotate. By the foregoing process, the loading operation of the disk 1 is completed.

Also, the guiding roller 421 is rotated while a hinge unit of the guiding roller 421 is guided by the cam groove 340 provided on the slider 300. Therefore, the guiding roller 421 is lowered and separated from the disk 1. At this time, the disk 1 can be rotated on the turn table and information is recorded or recorded information is played by the pickup apparatus (not shown).

In order to unload the disk 1 that has been completely loaded as described above, the driving motor 210 is rotated in a reverse direction. Then, the slider 300 begins to be returned in the direction A1 by the driving gear 250 and the rack gear 310 of FIG. 3. After that, the transferring roller 110 is returned to the original position and contacts the disk 1. Also, the sub-chassis 600 cooperates with the slider 300 to move the slider in the direction B2. Then, the chucking unit 60 cooperates with the sub-chassis 600, thus releasing the chucking of the disk 1.

Figure 12:
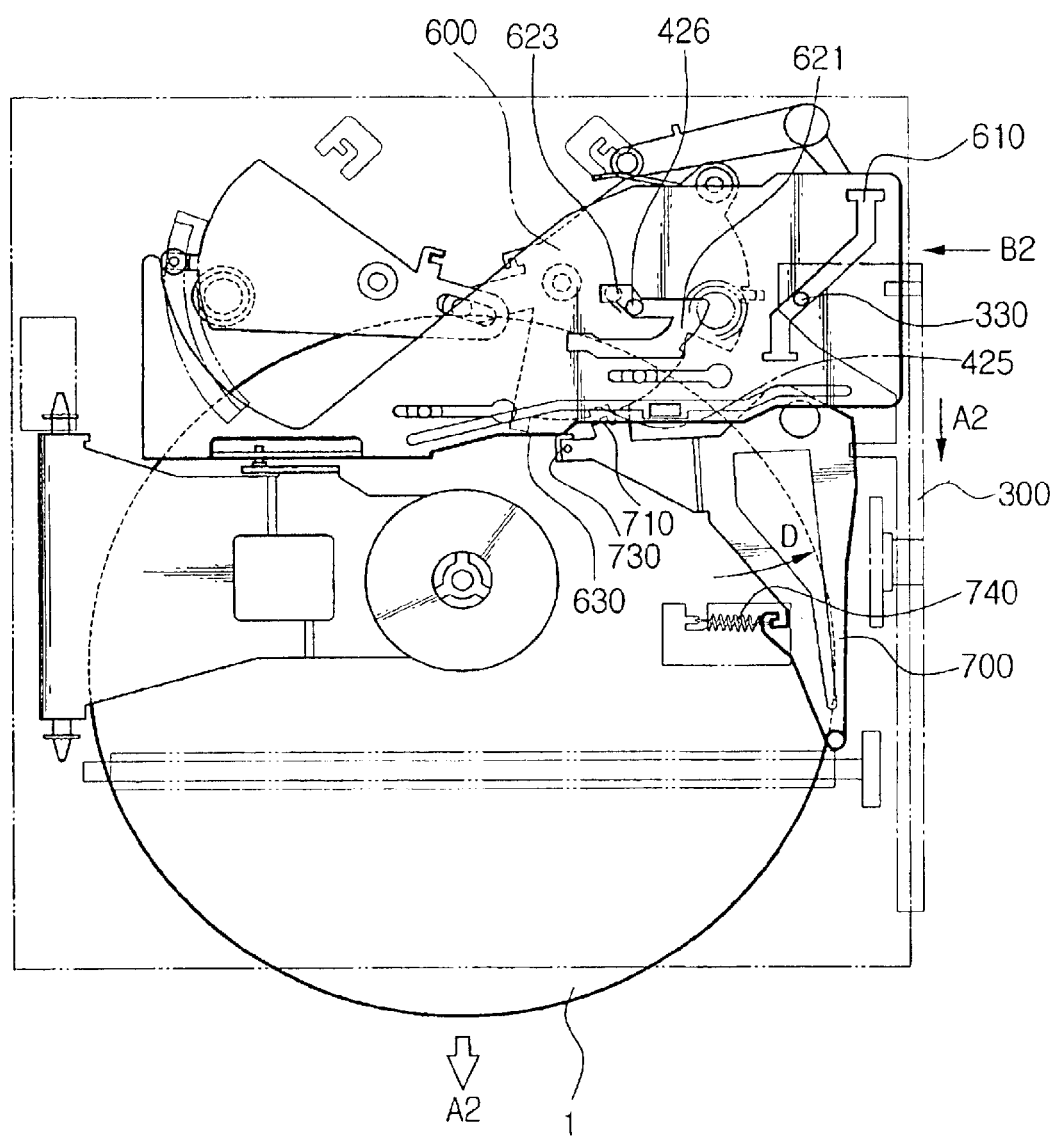

Then, as shown in FIG. 12, the disk 1 is moved back in the direction A2 by the transferring roller 110. Also, the sub-chassis 600 is moved in the direction B2, so that the guiding pin 426 is guided and moved to the main slit 621 from the sub-slit 623.

After that, if the disk 1 is moved back further, the disk 1 pushes the interfering pin 720 of the locking lever 700, thus rotating the locking lever 700 in the direction D. Then, the locking protuberance 710 of the locking lever 700 moves out of the second locking groove 425 of the second pivoting plate 420. Therefore, the lockage for each of the first and the second pivoting plates 410 and 420 due to the locking lever 700 is released, but the guiding pin 426 does not come out of the sub-slit 623 yet, so that the first and the second pivoting plates can not be returned to the original position completely. The disk 1 is then moved back further and the distance between the disk 1 and the guiding rollers 411 and 421 keeps widening.

Figure 13:
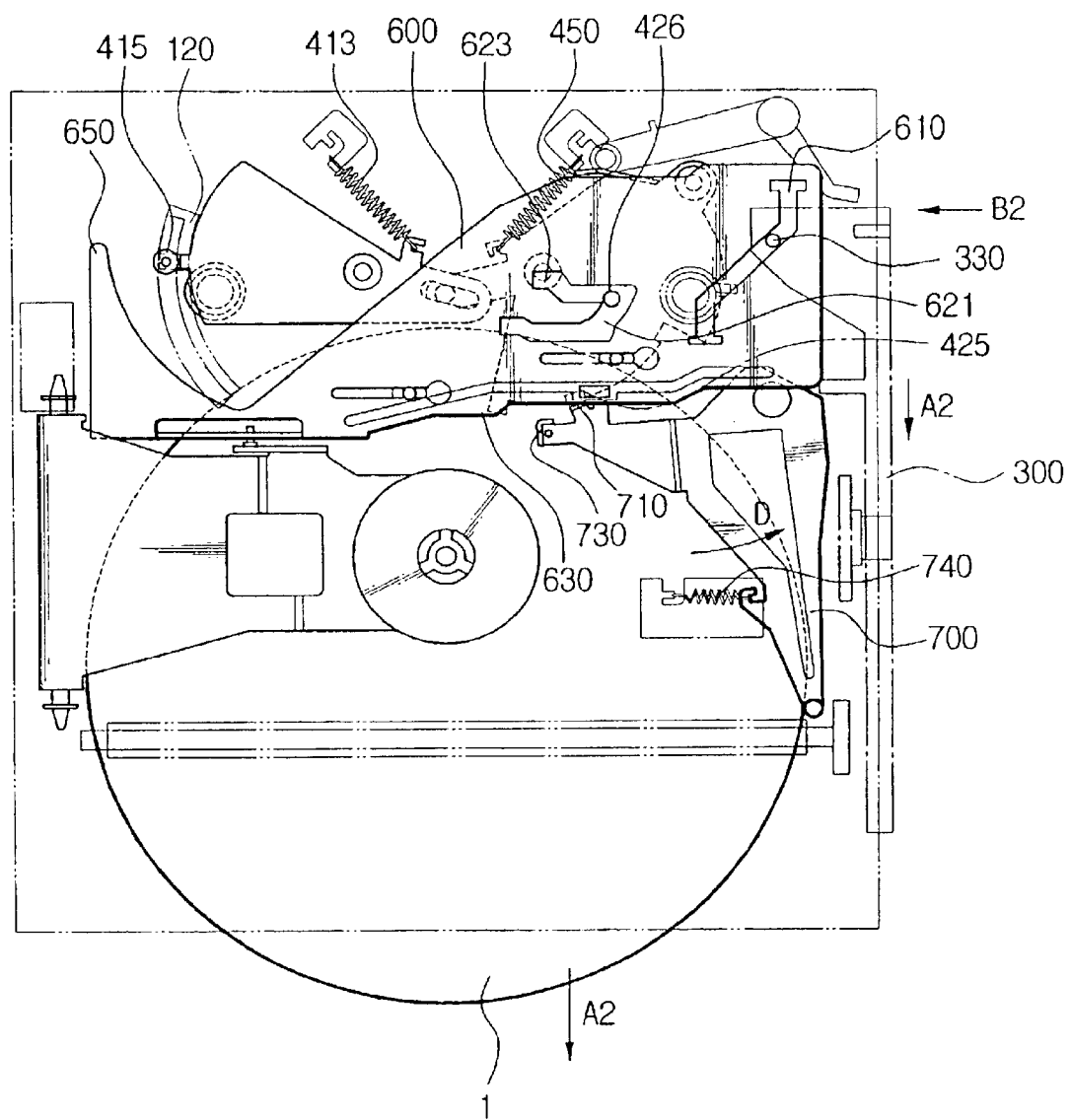

As the sub-chassis 600 is moved further in the direction B2 as shown FIG. 13, the guiding pin 426 comes out of the sub-slit 623 and moves into the main slit 621. Then, the cam guiding unit 650 is overlapped lengthwise on the cam guiding slit 120. The first rotating plate 410 and the second rotating plate 420 are restored to their original positions by the restoring force of the first and the second springs 413 and 450. However, unlike the related art discussed above, the cam guiding member 415 is restored back, and thus touches the cam guiding unit 650, so that impulse generation due to abrupt restoration of the first and the second rotating plates 410 and 420 does not occur. That is, the more the sub-chassis 600 is moved in the direction B2, the less overlapped the portion of the cam guiding slit 120 and the cam guiding unit 650 become, so that the cam guiding member 415 is slowly guided and restored back, and the position as shown in FIG. 7 is achieved.

As described above, since the disk loading apparatus of the disk player according to certain embodiments of the present invention has the structure in which the interworking mechanism is guided to gradually return during the unloading of the disk, collision or impulse due to abrupt and undesired movement can be prevented.

Accordingly, the reliability of the disk player is improved. While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for loading a disk into a disk player, the apparatus comprising:
   a main chassis on which is mounted a transferring roller, adapted to transfer the disk to an inside of the player;
   a power transferring unit, adapted to transfer power of a driving motor to the transferring roller;
   a slider, mounted on the main chassis, and adapted to be moved back and forth along a loading direction of the disk, and to selectively connect to the power transferring unit to be driven back and forth;
   an interworking mechanism, adapted to guide the disk into a chucking position, and which is adapted to be moved by movement of the disk upon entrance of the disk into the disk player, and which is connected to the power transferring unit by the movement of the slider;
   a sub-chassis, adapted to move back and forth in a direction substantially perpendicular to the loading direction in cooperation with the slider, and which is adapted to cooperate with the interworking mechanism to isolate the interworking mechanism from the disk positioned at a chucking position;
   a locking lever, adapted to selectively lock or unlock a movement of the interworking mechanism by cooperating with the disk that is moving along the loading direction or with the sub-chassis; and
   an impulse alleviating device, coupled to the interworking mechanism of the disk player which is adapted to guide the disk into the chucking position, the device being adapted to regulate movement of the interworking mechanism with respect to the sub-chassis of the disk player when the disk is unloaded from the disk player, to thus reduce the impulse that is generated when the interworking mechanism is restored to an original position at which the interworking mechanism was positioned prior to the disk being loaded into the disk player.

2. An apparatus as claimed in claim 1, wherein the impulse alleviating device comprises:
   a cam guiding pin, projected upward from the interworking mechanism, and adapted to move along a guiding slit provided on the main chassis in response to movement of the interworking mechanism; and
   a cam guiding unit, formed on the sub-chassis, and adapted to come into contact with the cam guiding pin when the cam guiding pin is restored to an original position to control a speed at which the interworking mechanism is restored to its said original position upon unloading of the disk.

3. An apparatus as claimed in claim 2, wherein the cam guiding unit is substantially perpendicular lengthwise to the guiding slit.

4. An apparatus as claimed in claim 1, wherein the impulse alleviating device comprises:
   a cam guiding pin, projected upward from the first pivoting plate, and adapted to move along a guiding slit formed on the main chassis; and
   a cam guiding unit, extended lengthwise from one side of the sub-chassis so that the cam guiding unit overlaps the guiding slit by a certain amount, and being adapted to contact the cam guiding pin when the cam guiding pin is restored to an original position to reduce a restoring force upon unloading of the disk.

5. An apparatus as claimed in claim 4, wherein:
   upon unloading of the disk, the sub-chassis cooperates with the slider and is restored to its original position, and restoration of the cam guiding pin to its said original position is allowed by reducing the amount that the cam guiding unit overlaps the guiding slit.

6. An apparatus as claimed in claim 1, wherein the interworking mechanism comprises:
   a first pivoting plate which is mounted on the main chassis so that the first pivoting plate can rotate a predetermined angle, and which is adapted to be rotated when pushed by movement of the disk; and
   a second pivoting plate, adapted to cooperate with the first pivoting plate and mounted on the main chassis to be rotated by movement of the disk when the disk moves forward, and adapted to selectively be locked and unlocked to and from the locking lever.

7. An apparatus as claimed in claim 6, wherein the interworking mechanism further comprises:
   a pushing lever, mounted on the main chassis and adapted to be rotated, and which is further adapted to cooperate with the second pivoting plate that is rotated by the movement of the disk, to push the slider so that the slider becomes connected with the power transferring unit; and
   at least one spring, adapted to elasticity bias each of the first and the second pivoting plates in a direction to touch the disk.

8. An apparatus as claimed in claim 7, wherein the at least one spring comprises first and second springs.

9. An apparatus as claimed in claim 1, wherein the device comprises:

a cam guiding pin, projected upward from the interworking mechanism, and adapted to move along a guiding slit provided on a main chassis of the disk player in response to movement of the interworking mechanism; and a cam guiding unit, formed on asub-chassis of th edisk player, and adapted to come into contact with the cam guidng pion when the cam guiding pin is restored to an original position to control a speed at which the interworking mechanism is restored to its original position upon unloading of the disk from the disk player.

10. An apparatus as claimed in claim 9, wherein the cam guiding unit is substantially perpendicular lengthwise to the guiding slit.

11. An apparatus as claimed in claim 1, wherein the device comprises:

a cam guiding pin, projected upward from the first pivoting plate, and adapted to move along a guiding slit formed on a main chassis of the disk player; and a cam guiding unit, extended lengthwise from one sided of the sub-chassis so that the cam guiding unit overlaps the guiding slit by a certain amount, and being adapted to contact the cam guiding pin when the cam guiding pin is restored to an original position to reduce a restoring force upon unloading of the disk.

12. An apparatus as claimed in claim 11, wherein:

upon unloading of the disk, the sub-chassis cooperates with the slider and is restored to its original position, and restoration of the cam guiding pin to its said original position is allowed by reducing the amount that the cam guiding unit overlaps the guiding slit.

* * * * *